(12) United States Patent
Kazi

(10) Patent No.: US 10,031,809 B2
(45) Date of Patent: Jul. 24, 2018

(54) EFFICIENT METHOD FOR REBUILDING A SET OF ENCODED DATA SLICES

(71) Applicant: International Business Machines Corporation, Armonk, NY (US)

(72) Inventor: Asimuddin Kazi, Naperville, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 15/215,418

(22) Filed: Jul. 20, 2016

(65) Prior Publication Data
US 2018/0024886 A1    Jan. 25, 2018

(51) Int. Cl.
| | |
|---|---|
| G06F 11/10 | (2006.01) |
| G06F 11/20 | (2006.01) |
| G06F 3/06 | (2006.01) |
| G06F 9/50 | (2006.01) |

(52) U.S. Cl.
CPC .......... *G06F 11/1092* (2013.01); *G06F 3/064* (2013.01); *G06F 3/067* (2013.01); *G06F 3/0619* (2013.01); *G06F 11/1088* (2013.01); *G06F 3/0689* (2013.01); *G06F 9/50* (2013.01); *G06F 11/2094* (2013.01)

(58) Field of Classification Search
CPC ............. G06F 11/1092; G06F 11/2094; G06F 3/0689; G06F 9/50; G06F 11/1088; G06F 3/067; G06F 3/0619; G06F 3/064
USPC ........................................................ 714/764
See application file for complete search history.

(56) References Cited

U.S. PATENT DOCUMENTS

| | | | |
|---|---|---|---|
| 4,092,732 | A | 5/1978 | Ouchi |
| 5,454,101 | A | 9/1995 | Mackay et al. |
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — James C Kerveros
(74) *Attorney, Agent, or Firm* — Garlick & Markison; Timothy W. Markison; Harry S. Tyson, Jr.

(57) ABSTRACT

A method begins by a dispersed storage (DS) processing module identifying an encoded slice requiring rebuilding. The method continues by the DS processing module determining whether the encoded data slice is part of a fan-out encoded data slice group and, when it is part of a fan-out encoded data slice group determining by the DS processing module whether a valid encoded data slice of the fan-out data slice group is available. When a copy of the encoded data slice of the fan-out encoded data slice group is not available, the method continues by the DS processing module rebuilding the encoded data slice. A storage unit then stores the rebuilt encoded data slice and creates copies of the rebuilt encoded data slice to produce a rebuilt fan-out encoded data slice group.

20 Claims, 7 Drawing Sheets

(56) References Cited

U.S. PATENT DOCUMENTS

| | | | |
|---|---|---|---|
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,271,830 | B2* | 9/2012 | Erofeev ............... G06F 11/1456 710/53 |
| 8,275,902 | B2* | 9/2012 | Philip ............... G06F 17/30194 370/232 |
| 8,285,684 | B2* | 10/2012 | Prahlad ............. G06F 17/30212 707/661 |
| 9,356,626 | B2* | 5/2016 | Alexeev ............... H03M 13/2906 |
| 9,778,878 | B2* | 10/2017 | Hodgdon ............... G06F 3/0659 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2005/0283654 | A1* | 12/2005 | Wood ................ G06F 11/1084 714/6.32 |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2013/0054913 | A1* | 2/2013 | Maeda ...................... G06F 9/50 711/162 |
| 2015/0143167 | A1* | 5/2015 | Maeda ................ G06F 11/2094 714/6.22 |
| 2016/0313944 | A1* | 10/2016 | Hodgdon ................ G06F 3/061 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 1511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

\* cited by examiner distributed, or dispersed, storage network (DSN) 10

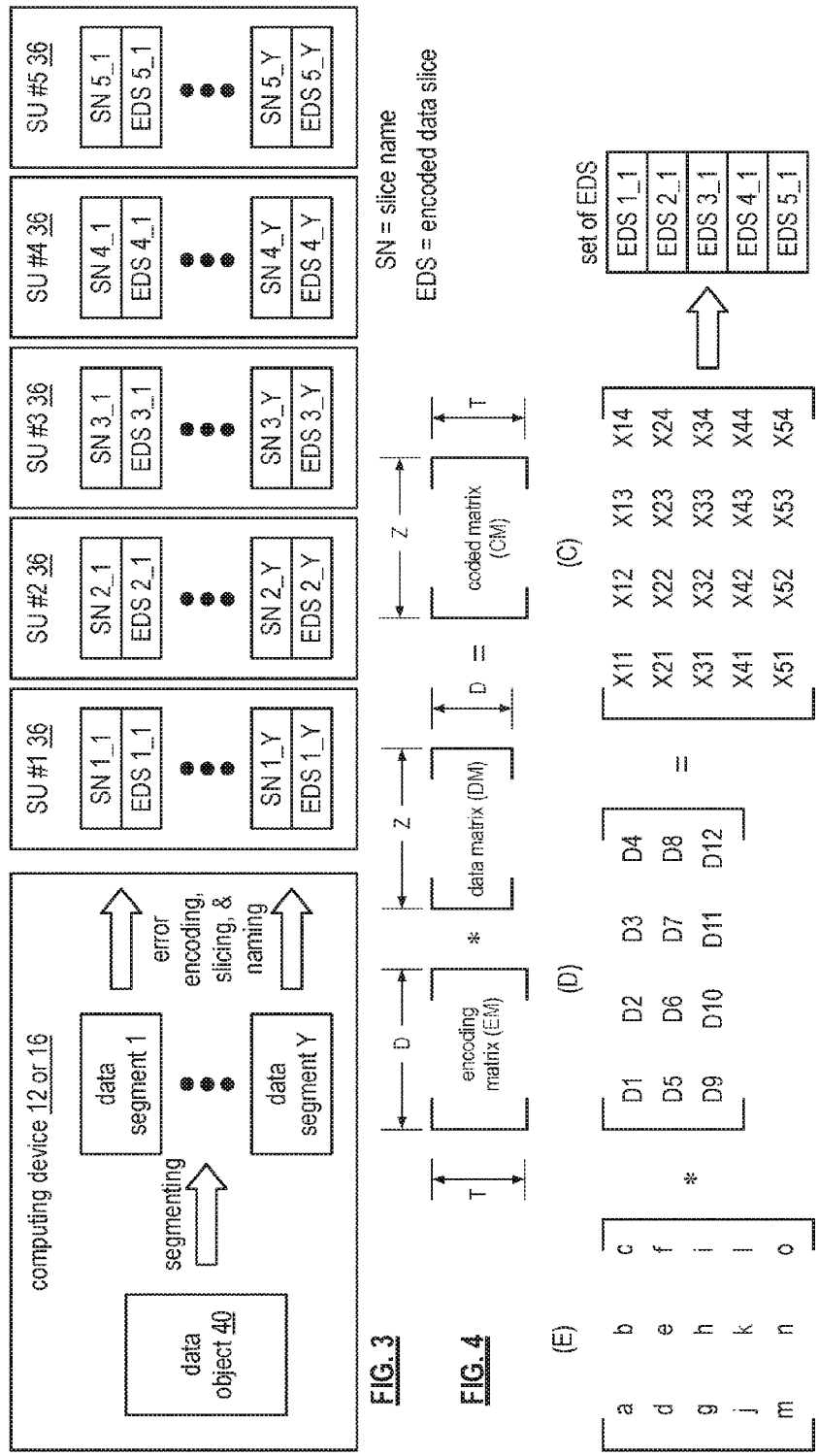

EFFICIENT METHOD FOR REBUILDING A SET OF ENCODED DATA SLICES

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

When a dispersed storage system is used for content distribution (e.g., video on demand, music on demand, etc.) or other high volume data accessing applications, it is often beneficial to store multiple copies of the data content by different components of the storage system. When multiple concurrent read requests are received, the different components process them in an efficient manner (e.g., with minimal latency from the requestor's viewpoint). When the data content is stored as a plurality of sets of encoded data slices, multiple copies of the plurality of sets of encoded data slices are stored. When multiple copies of a particular stored encoded data slice require rebuilding, a single rebuild of one of the encoded data slices within the set of encoded data slice copies can be used to create and store the copies.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
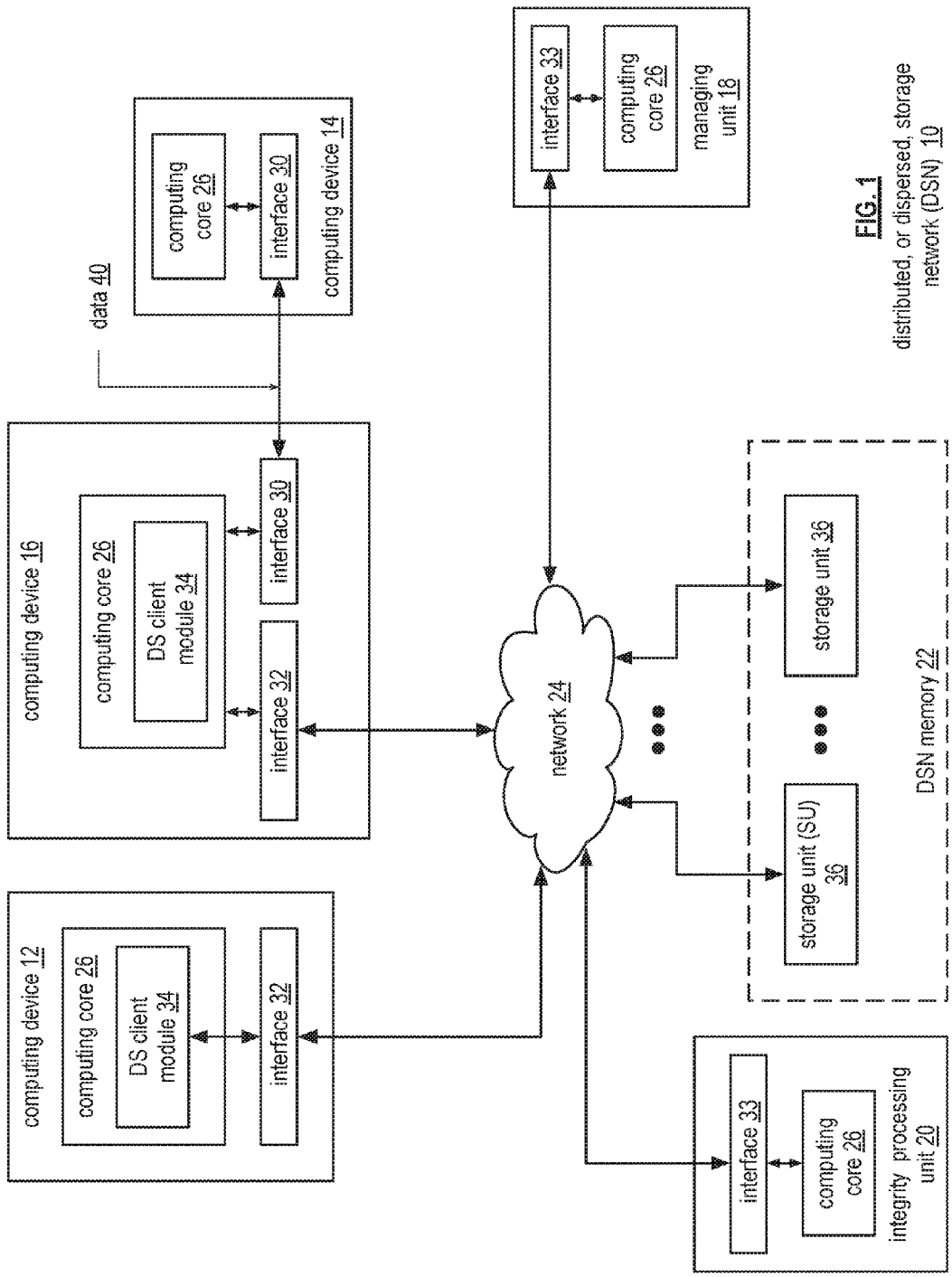
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
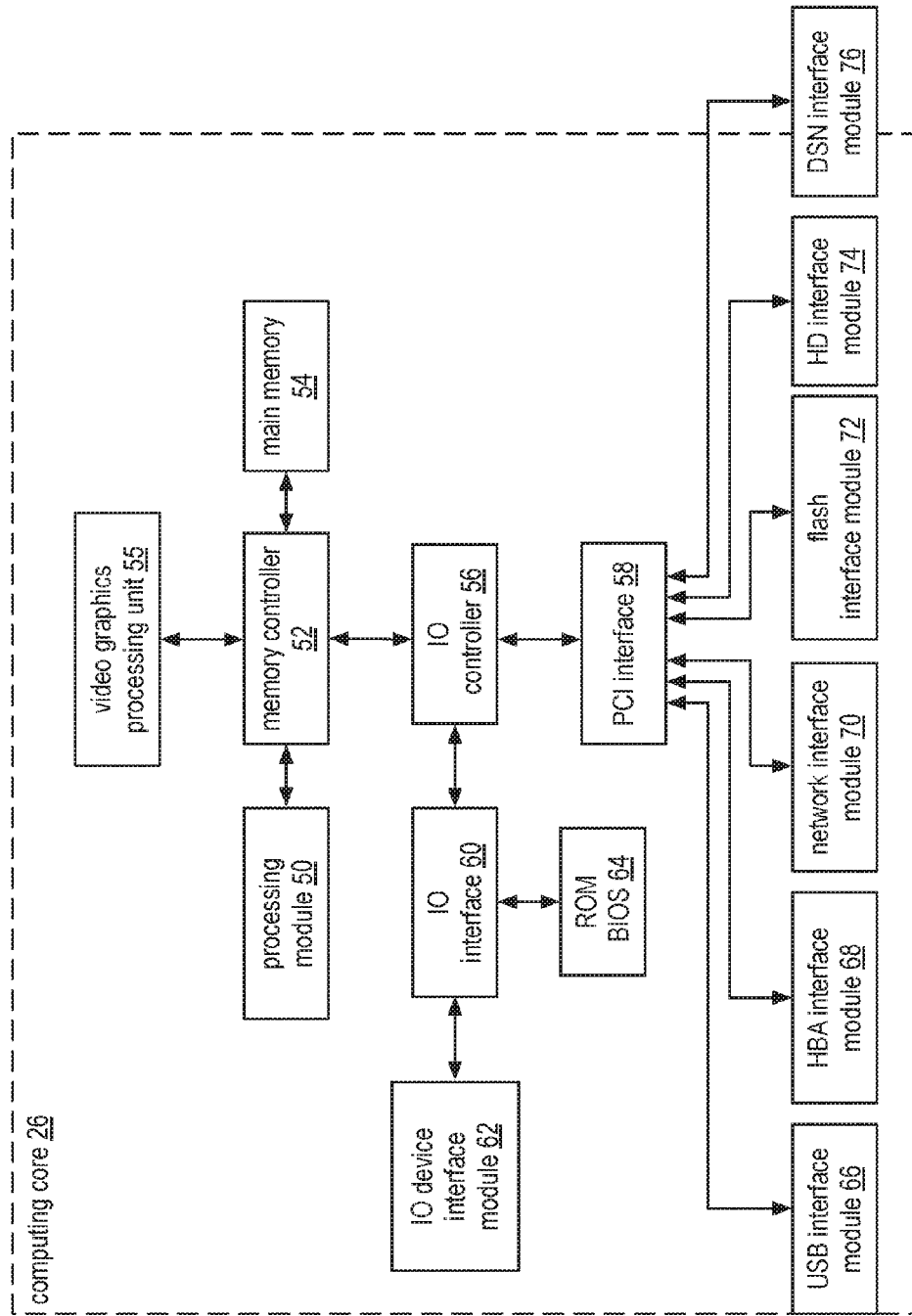
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a storage DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. (Could be a module running in one or more of the storage units). At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the network interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
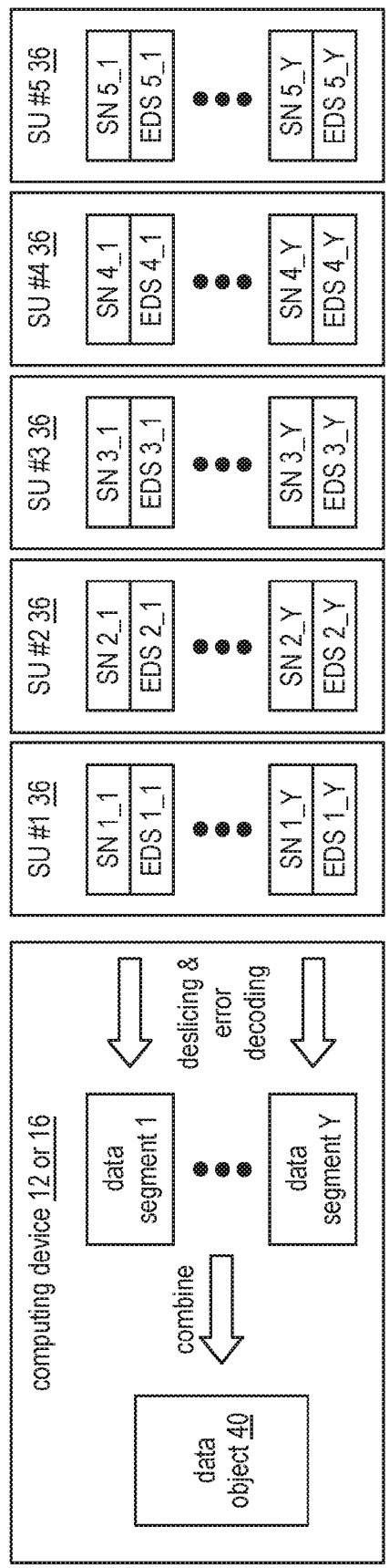
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
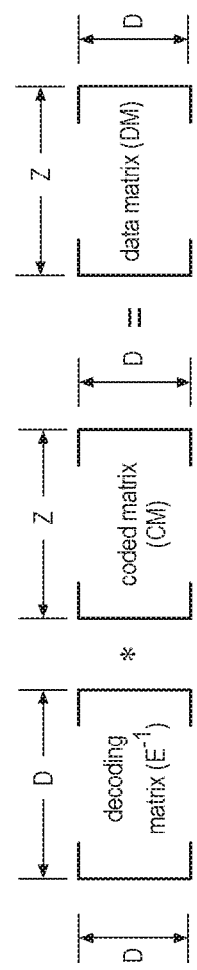
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
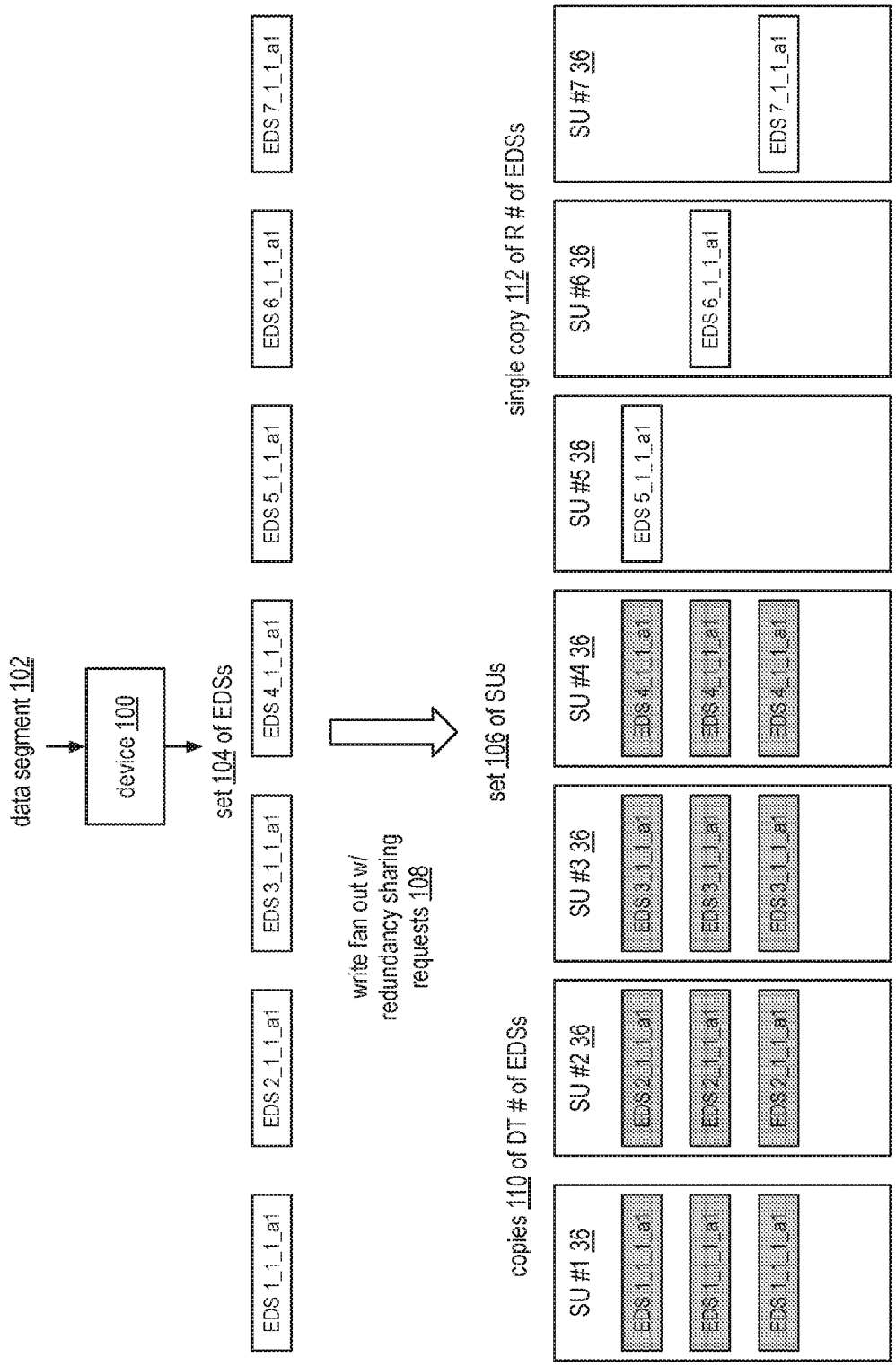
FIG. 9 is a schematic block diagram of an example of redundant storage of a set of encoded data slices in accordance with the present invention.

FIG. 9 is a schematic block diagram of an example of efficient redundant storage of a set of encoded data slices. In this example, a device 100 (e.g., one or more computing devices 12-16, a managing unit 18, an integrity processing unit 20, and/or storage unit) dispersed storage error encodes a data segment 102 of a data object into a set 104 of encoded data slices. An example of encoding is provided with reference to FIGS. 3-5.

The device 100 then sends a set 108 of write fan-out with redundancy sharing requests (write fan-out request) to a set 106 of storage units of the DSN. The write fan-out request is a special form of a write request in that it requests the storage units to store the set 104 of encoded data slices (EDSs), one or more copies 110 of a decode threshold number of encoded data slices of the set 104 of encoded data slices and a single copy 112 of a redundant number of encoded data slices.

As discussed above, the decode threshold number of encoded data slices (EDSs) corresponds to the minimum number of encoded data slices that is needed to recover the data segment. An example of this is discussed with reference to FIGS. 7 and 8. In the example of FIG. 9, the set of EDSs includes seven EDSs. The decode threshold number is four (e.g., the gray shaded EDSs) and the remaining three EDS are the redundant number of EDSs (e.g., non-shaded EDSs).

In response to the set of write fan-out with redundancy sharing requests, the storage units store a number of copies of a decode threshold number of encoded data slices of the set of encoded data slices. In this example, three copies of the decode threshold number of EDSs are made and stored, which includes the original decode threshold number of EDSs. Note that more or less than three copies of the decode threshold number of EDSs may be made and stored. The particular number of copies will depend on a combination of one or more of: data access request rates, data rate capabilities of the DSN, latency issues, data size of the data objects being requested, type of data, and desired data loading.

Figure 10:
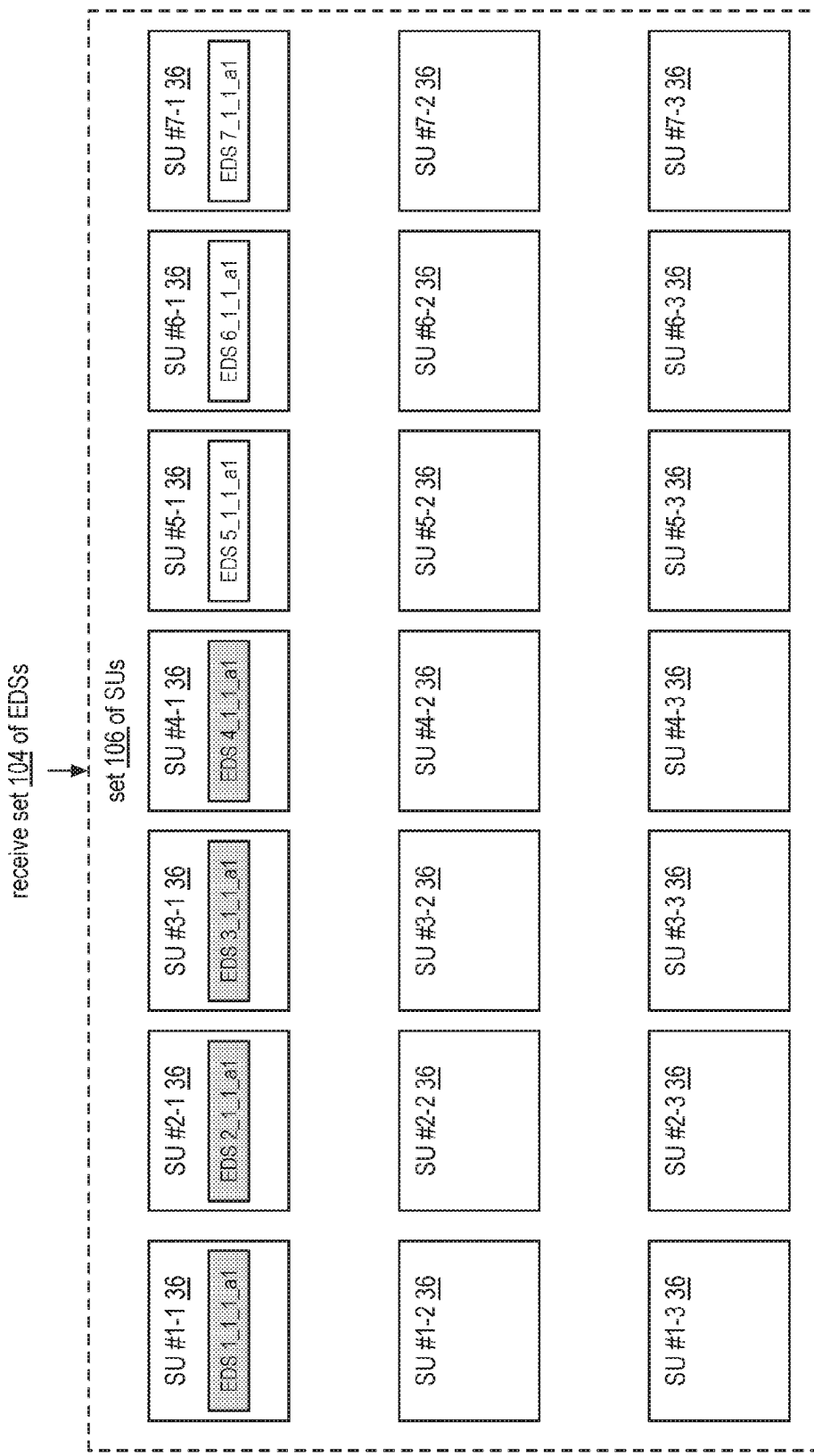
FIG. 10 is a schematic block diagram of another example of redundant storage of a set of encoded data slices in accordance with the present invention.

In addition, the storage units store a single copy of a redundancy number of encoded data slices of the set of encoded data slices. In this example, there are three EDSs in the redundancy number of encoded data slices of the set of encoded data slices, which are each stored in a different storage unit. There are a variety of ways in which the set of storage units may store the decode threshold number of encoded data slices of the set of encoded data slices and the redundancy number of encoded data slices of the set of encoded data slices. FIG. 10 provides an additional example.

FIG. 10 is a schematic block diagram of another example of efficient redundant storage of a set of encoded data slices. In this example, the set 104 of storage units includes a plurality of groupings of storage units or storage pool of storage units. Each set includes seven storage units SU 1 through SU 7, where each storage unit in the first position (e.g., SU 1-1, SU 1-2, and SU 1-3) store a first encoded data slice of a set of encoded data slices, and so on.

As shown, the first grouping of storage units (e.g., SU 1-1 through SU 7-1) receives the set 108 of write fan-out with redundancy sharing requests for the set 104 of encoded data slices. Each of storage units SU 1-1 through SU-7 interprets the set 108 of write fan-out with redundancy sharing requests and its corresponding encoded data slice to determine if and how many copies of its encoded data slice are to be made. Each storage unit further determines where the copy, or copies, of its encoded data slice are to be stored.

As a specific example, a first storage unit (e.g., SU 1-1) receives a first one of the set of write fan-out with redundancy sharing requests and a first encoded data slice of the decode threshold number of encoded data slices. The first storage unit replicates the first encoded data slice to produce one or more copies of the first encoded data slice. The first storage unit stores the first encoded data slice and sends the one or more copies of the first encoded data slice to one or more other first storage units (e.g., SU 1-2 and SU 1-3 as shown in FIG. 10).

As another specific example, a first redundancy storage unit (e.g., SU 1-5) receives one of the write fan-out with redundancy sharing requests and a first encoded data slice of the redundancy number of encoded data slices (e.g., EDS 5_1_1_a1). The first redundancy storage unit determines whether to store the first redundancy encoded data slices or to send it to another first redundancy storage unit (e.g., to SU 5-2 or SU 5-3). When the first redundancy storage unit determines to send it to another first redundancy storage unit, the first redundancy storage unit sends the first redundancy encoded data slice to the other first redundancy storage unit. If not, the first redundancy storage unit stores the first redundancy encoded data slice. Note that the first redundancy storage unit selects the other first redundancy storage unit from a plurality of first redundancy storage units of the set of storage units.

Figure 11:
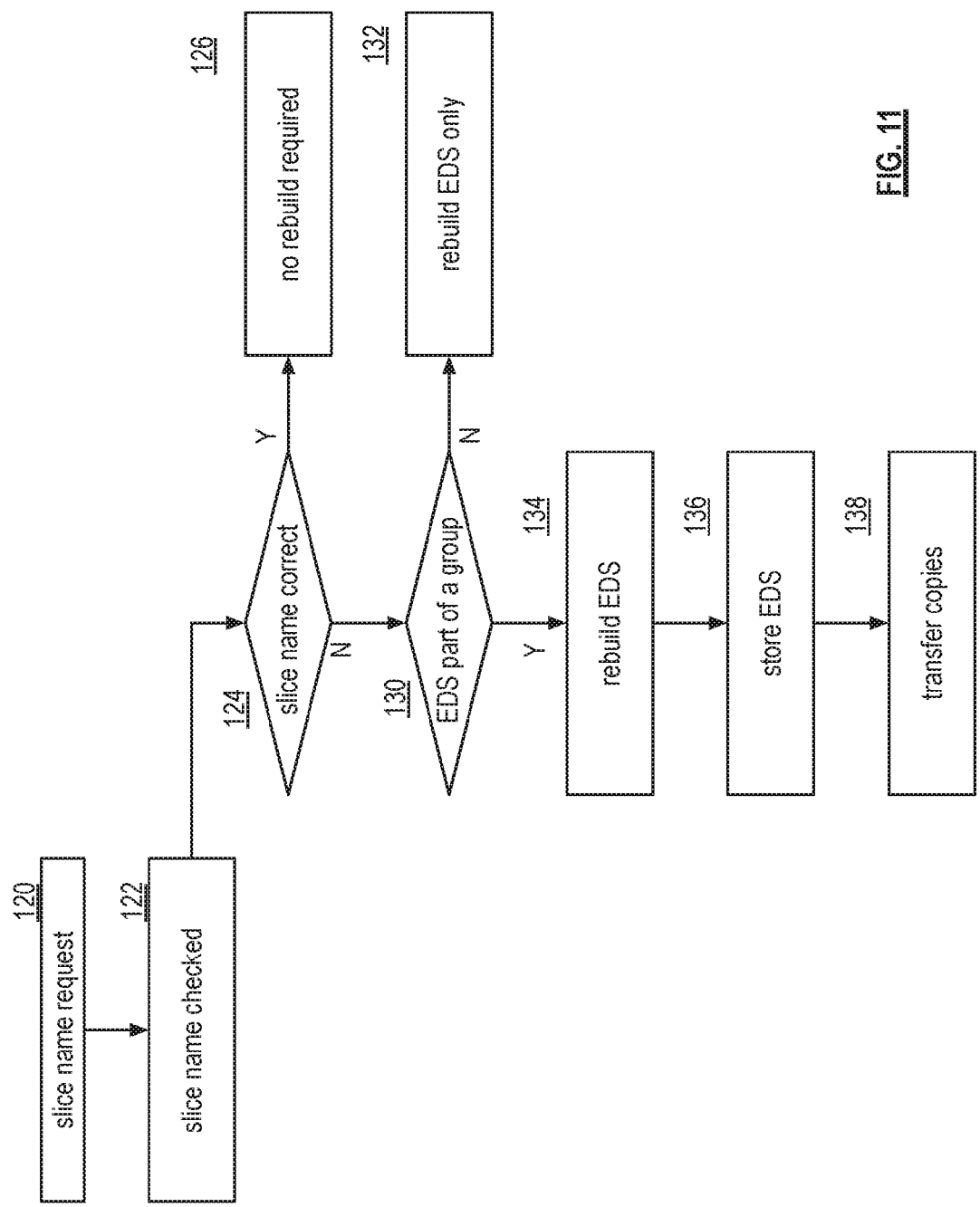
FIG. 11 is a logic diagram of an example method of rebuilding a set of encoded data slices.

FIG. 11 is a logic diagram of an example of a method of rebuilding a set of encoded data slices. The method includes step 120 where the integrity processing unit ("IPU") attempts to retrieve/list encoded data slices, and/or slice names of an encoded data slice. The method continues at step 122 where the slice name can be verified against a check list or other source to determine whether the encoded data slice is valid. The attributes of a valid encoded data slice may include (but are not limited to) revision number, correct CRC codeword, etc. When the encoded data slice is valid, no further action is taken, as shown in step 126.

When the encoded data slice is determined to not to be valid and therefore needs rebuilding, the method continues at step 130 where the IPU determines whether the encoded data slice is one of a set of encoded data slices. When an encoded data slice is determined to be one of a set of encoded data slices the method continues to step 134, where the not valid encoded data slice is rebuilt and then stored in step 136. The now valid encoded data slice is then transferred, in step 138, to another memory device within the same storage unit or to other storage units consistent with the description above. When an encoded data slice is determined to not be one of a set of encoded data slices the method continues to step 132 and the EDS is rebuilt without copies being created.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
identifying, by a device of a dispersed storage network (DSN), an encoded data slice requiring rebuilding, wherein the encoded data slice is part of a set of encoded data slices produced by performing a dispersed storage error encoding function on a data segment;
determining, by the device, whether the encoded data slice is part of a fan-out encoded data slice group in which one or more copies of the encoded data slice are stored in the DSN;
when the encoded data slice is part of the fan-out encoded data slice group:
determining, by the device, whether a valid encoded data slice of the fan-out encoded data slice group is available for retrieval from memory of the DSN;
when a valid encoded data slice of the fan-out encoded data slice group is not available, rebuilding, by the device or another device, the encoded data slice to produce a rebuilt encoded data slice;
storing, by a storage unit of the DSN, the rebuilt encoded data slice;
and creating, by the storage unit, one or more copies of the rebuilt encoded data slice to produce a rebuilt fan-out encoded data slice group.

2. The method of claim 1, further comprising propagating storage of the one or more copies of the rebuilt encoded data slice within the storage unit when the valid encoded data slice of the fan-out encoded data slice group is not available.

3. The method of claim 1, further comprising propagating storage of the one or more copies of the rebuilt encoded data slice to other storage units with the same pillar number as the encoded data slice when the valid encoded data slice of the fan-out encoded data slice group is not available.

4. The method of claim 1, where the number of copies of the encoded data slice in the fan-out encoded data slice group is based on at least one of data embedded in a fan-out request, a rebuild request, or a slice name.

5. The method of claim 1, where a storage location of the one or more copies of the rebuilt encoded data slice in the rebuilt fan-out encoded data slice group is based on at least one of data embedded in a fan-out request, a rebuild request, or a slice name.

6. The method of claim 1, further comprising rebuilding the encoded data slice without creating copies of the rebuilt encoded data slice when the encoded data slice requiring rebuilding is determined not to be part of a fan-out encoded data slice group.

7. The method of claim 1, further comprising replacing the encoded data slice requiring rebuilding with a valid encoded data slice of the fan-out encoded data slice group when the valid encoded data slice is available.

8. The method of claim 1, wherein the requiring the rebuilding of the encoded data slice is based on the storage unit not having received the encoded data slice or a determination that the encoded data slice is corrupt.

9. The method of claim 1, wherein rebuilding the encoded data slice to produce a rebuilt encoded data slice is completed before creating the one or more copies of the rebuilt encoded data slice to reproduce the rebuilt fan-out encoded data slice group.

10. The method of claim 1, wherein determining whether the encoded data slice requiring rebuilding is part of a fan-out encoded data slice group comprises at least one of using a look-up table, accessing a slice name of the encoded data slice, or accessing a rebuild message.

11. The method of claim 1, wherein the encoded data slice is one of a decode threshold number of encoded data slices of the set of encoded data slices for which a respective fan-out encoded data slice group is stored in the DSN.

12. A computer readable memory comprises:
a first memory element that stores operational instructions that, when executed by a computing device of a dispersed storage network (DSN), causes the computing device to:
determine that an encoded data slice requires rebuilding, wherein the encoded data slice is part of a set of encoded data slices produced by performing a dispersed storage error encoding function on a data segment;
determine whether the encoded data slice requiring rebuilding is part of a fan-out encoded data slice group in which one or more copies of the encoded data slice are stored in the DSN;
when the encoded data slice is determined to be part of the fan-out encoded data slice group:
determine whether a valid encoded data slice of the fan-out encoded data slice group is available for retrieval from memory of the DSN;
when a valid encoded data slice of the fan-out encoded data slice group is not available, rebuild the encoded data slice to produce a rebuilt encoded data slice;
a second memory element that stores operational instructions that, when executed by a storage unit of the DSN, causes the storage unit to:
direct the storage unit to store the rebuilt encoded data slice; and
create one or more copies of the rebuilt encoded data slice to produce a rebuilt fan-out encoded data slice group.

13. The computer readable memory of claim 12 wherein the second memory element further causes the storage unit to propagate the one or more copies of the rebuilt encoded data slice within the storage unit.

14. The computer readable memory of claim 12 wherein the second memory element further causes the storage unit to propagate storage of the one or more copies of the rebuilt encoded data slice to other storage units associated with the same pillar number as the encoded data slice.

15. The computer readable memory of claim 12 wherein the first memory element further causes the computing device to access data embedded in an encoded data slice name associated with the encoded data slice to determine the number of copies of the rebuilt encoded data slice in the fan-out encoded data slice group.

16. The computer readable memory of claim 12 wherein the first memory element further causes the computing device to access data embedded in an encoded data slice name associated with the encoded data slice to determine a storage location of one or more encoded data slice copies in the fan-out encoded data slice group.

17. The computer readable memory of claim 12, wherein when a valid encoded data slice of the fan-out encoded data slice group is available the first memory element further causes the computing device to replace the encoded data slice requiring rebuilding with the valid encoded data slice.

18. The computer readable memory of claim 12, wherein the first memory element further causes the computing device to determine that the encoded data slice requires rebuilding based on the storage unit not having received the encoded data slice or a determination that the encoded data slice is corrupt.

19. The computer readable memory of claim 12, wherein the second memory element further causes the storage unit to:
   rebuild the encoded data slice to produce a rebuilt encoded data slice is completed before creating the one or more copies of the rebuilt encoded data slice to reproduce the rebuilt fan-out encoded data slice group.

20. The computer readable memory of claim 12, wherein the first memory element further accesses a look-up table to determine whether the encoded data slice requiring rebuilding is part of a fan-out encoded data slice group.

* * * * *